United States Patent
Chang et al.

(10) Patent No.: US 9,638,870 B2
(45) Date of Patent: May 2, 2017

(54) OPTICAL CONNECTOR HAVING OPTICAL CEMENT WITHIN THE RESIN BODY

(71) Applicant: HON HAI PRECISION INDUSTRY CO., LTD., New Taipei (TW)

(72) Inventors: Chun-Yi Chang, New Taipei (TW); Jia-Hau Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 253 days.

(21) Appl. No.: 14/140,582

(22) Filed: Dec. 26, 2013

(65) Prior Publication Data

US 2014/0178011 A1    Jun. 26, 2014

(30) Foreign Application Priority Data

Dec. 26, 2012   (TW) .............................. 101150086 A

(51) Int. Cl.
*G02B 6/38*   (2006.01)
*G02B 6/42*   (2006.01)

(52) U.S. Cl.
CPC ........... *G02B 6/3853* (2013.01); *G02B 6/425* (2013.01); *G02B 6/4214* (2013.01); *G02B 6/4204* (2013.01)

(58) Field of Classification Search
CPC ........ G02B 6/00; G02B 6/3853; G02B 6/425; G02B 6/4214; G02B 6/4204
USPC .................................. 385/79–88, 90–99, 147
See application file for complete search history.

(56) References Cited

U.S. PATENT DOCUMENTS

| | | | | |
|---|---|---|---|---|
| 3,568,177 | A * | 3/1971 | Hasler | G09F 19/12 340/815.56 |
| 4,237,474 | A * | 12/1980 | Ladany | G02B 6/4202 257/712 |
| 5,005,934 | A * | 4/1991 | Curtiss | G02B 6/3512 250/227.11 |
| 5,764,833 | A | 6/1998 | Kakii | |
| 7,068,889 | B2 * | 6/2006 | Miyamae | G02B 6/4228 385/14 |
| 7,254,301 | B2 * | 8/2007 | Hoshino | G02B 6/4201 385/137 |

(Continued)

FOREIGN PATENT DOCUMENTS

CN    100356203    12/2007
CN    102023347    4/2011
(Continued)

*Primary Examiner* — Akm Enayet Ullah
(74) *Attorney, Agent, or Firm* — Wei Te Chung; Ming Chieh Chang

(57) ABSTRACT

An optical connector (1) for transferring light sent by fibers (2) and comprises a resin body (10) and a plurality of lenses (11), the resin body (10) includes a bottom surface (102), a top surface (101) opposite to the bottom surface (102), a front surface (103) connecting the top surface (101) and the bottom surface (102), and a slant surface (105) forms an angle with the front surface (103) and the top surface (101), the lenses (11) are set on the slant surface (105), the resin body (10) further includes a first recess (1011) recessed from the top surface (101) to the inner of the resin body (10), when the fibers (2) was assembled to the optical connector (1), the fibers (2) locate in the first recess (1011) and the optical connector (1) further includes optical cement (3) filled in the first recess (1011).

19 Claims, 5 Drawing Sheets

(56) References Cited

U.S. PATENT DOCUMENTS

| | | | |
|---|---|---|---|
| 7,907,802 B2 * | 3/2011 | Sano | G02B 6/4212 |
| | | | 385/14 |
| 8,641,296 B2 | 2/2014 | Nishimura | |
| 2003/0095746 A1 * | 5/2003 | Williamson | G02B 6/262 |
| | | | 385/33 |
| 2004/0062478 A1 * | 4/2004 | Ludington | G02B 6/2937 |
| | | | 385/33 |
| 2004/0234210 A1 * | 11/2004 | Nagasaka | G02B 6/4214 |
| | | | 385/88 |
| 2008/0252961 A1 * | 10/2008 | Mesaki | G02B 6/4208 |
| | | | 359/281 |
| 2013/0266260 A1 | 10/2013 | Morioka | |

FOREIGN PATENT DOCUMENTS

| | | |
|---|---|---|
| CN | 102023347 A | 4/2011 |
| CN | 102313938 | 1/2012 |
| JP | 2012108443 | 6/2012 |
| TW | 261665 | 11/1995 |
| TW | 201237488 A | 9/2012 |

* cited by examiner

OPTICAL CONNECTOR HAVING OPTICAL CEMENT WITHIN THE RESIN BODY

BACKGROUND OF THE INVENTION

1. Field of the Invention

The present invention relates to an optical connector, and more particularly to an optical connector can reduce the wastage of the light sent by the fibers.

2. Description of Related Art

Chinese patent No. 100356203C issued to OMRON on Dec. 19, 2007 discloses a conventional optical connector for transferring light sent by the fibers. The optical connector includes a resin body and a plurality of lenses assembled to the resin body. The resin body includes a front face and a back face perpendicular to each other. The lenses are set on the front face and the back face. When used, due to there is a distance between the fibers and the lenses, the light sent by the fibers first goes through the air then be transferred to the lenses. Due to there is a wide difference between the refractive index of the fiber, the air and the lens, the wastage of the light sent by the fibers are larger, which affect the transmission the light.

Hence, it is desirable to provide an improved carrier to overcome the aforementioned disadvantages.

SUMMARY OF THE INVENTION

Accordingly, an object of the present invention is to provide an optical connector to reduce the wastage of the light sent by the fibers.

According to one aspect of the present invention, an optical connector for transferring light sent by fibers and comprises a resin body and a plurality of lenses, the resin body includes a bottom surface, a top surface opposite to the bottom surface, a front surface connecting the top surface and the bottom surface, and a slant surface forms an angle with the front surface and the top surface, the lenses are set on the slant surface, the resin body further includes a first recess recessed from the top surface to the inner of the resin body, when the fibers was assembled to the optical connector, the fibers locate in the first recess and the optical connector further includes optical cement filled in the first recess.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
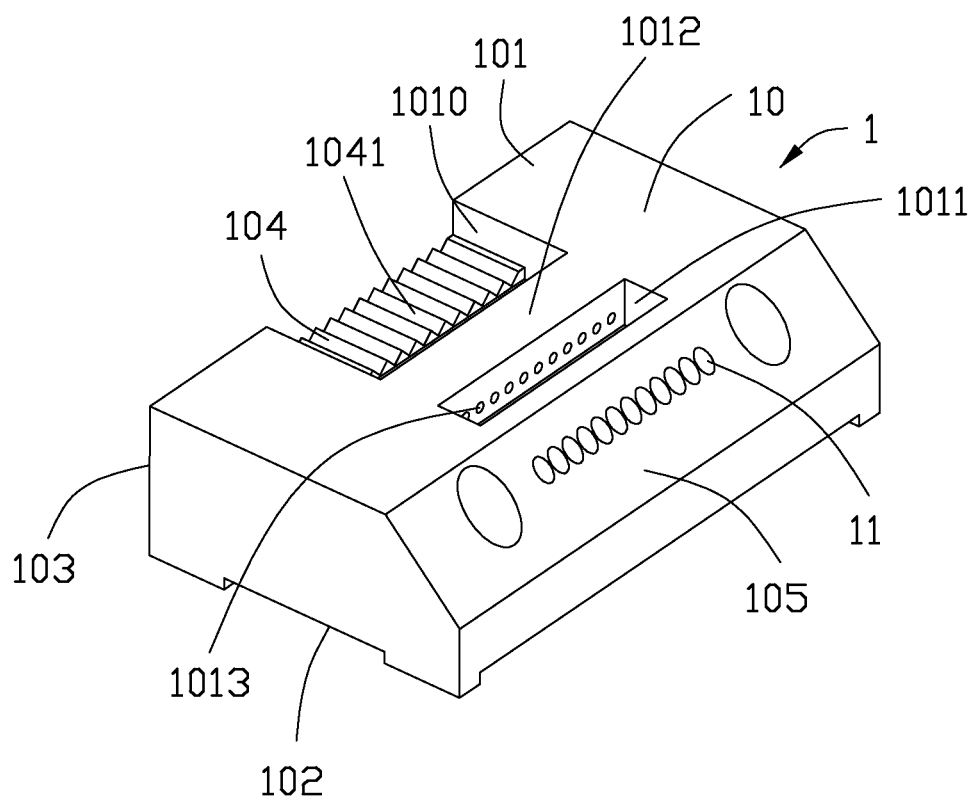
FIG. 1 is an isometric view of an optical connector according to a preferred embodiment of the present invention.
Figure 2:
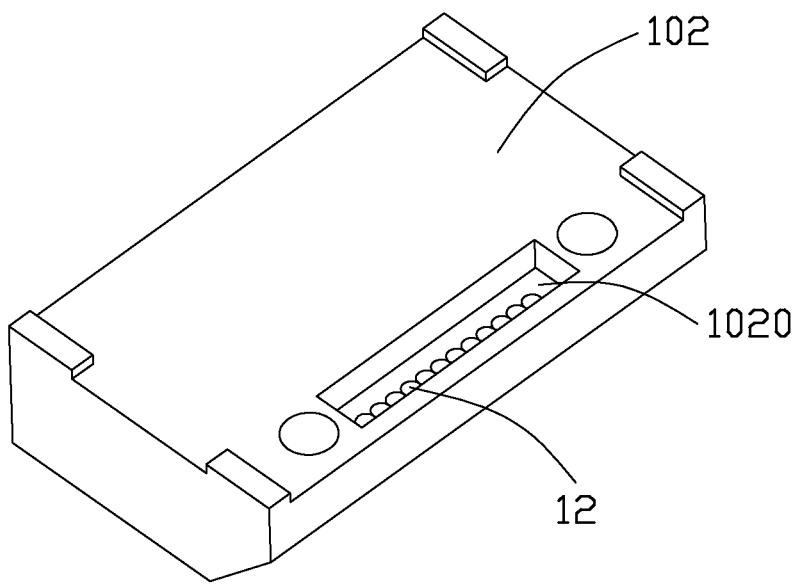
FIG. 2 is another view of the optical connector as shown in FIG. 1.
Figure 3:
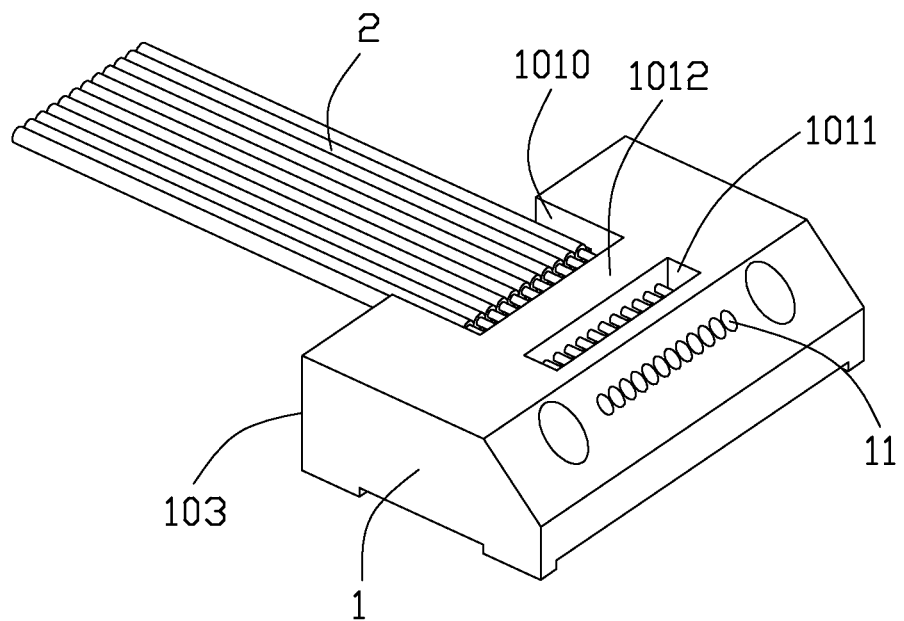
FIG. 3 is an assembled view of the optical connector and fibers.

FIGS. 1 to 3 illustrate an optical connector 1 in accordance to a preferred embodiment of the present invention. The optical connector 1 is used to transfer the light sent by fibers 2 and includes resin body 10, a plurality of lenses 11 and second lenses 12 set on the resin body 10. The lenses 11 are configured to ellipse shape.

The resin body 10 includes a top surface 101, a bottom surface 102 paralleled with the top surface 101 and a front surface 103 connecting the top surface 101 and the bottom surface 102, and a slant surface 105 connecting the top surface 101. The front surface 103 is vertical with the top surface 101 and the bottom surface 102. The angles formed by the slant surface 105 with the top surface 101 and the slant surface 105 with the front surface 103 are 45 degrees. The lenses 11 are set on the slant surface 105. There is a first recess 1011 and a second recess 1010 recessed from the top surface 101 to the inner of the resin body 10. The second recess 1010 penetrates the front surface 103. The resin body 10 further includes a retaining section 1012 between the first recess 1011 and the second recess 1010. The retaining section 1012 includes a plurality of holes 1013. The resin body 10 further includes a positioning portion 104 extending to the second recess 1010. The positioning portion 104 defines a plurality of slots 1041 corresponding to the holes 1013. The bottom surface 102 includes a third recess 1020 recessed to the inner of the resin body 10. The second lenses 12 are set in the third recess 1020.

Referring to FIG. 3, a plurality of fibers 2 are assembled from the front surface 103, each of the fibers 2 goes through the holes 1013 and locates in the first recess 1011. Each of the fibers 2 receives in the slot 1041 to enhance the positioning the fiber 2.

Figure 4:
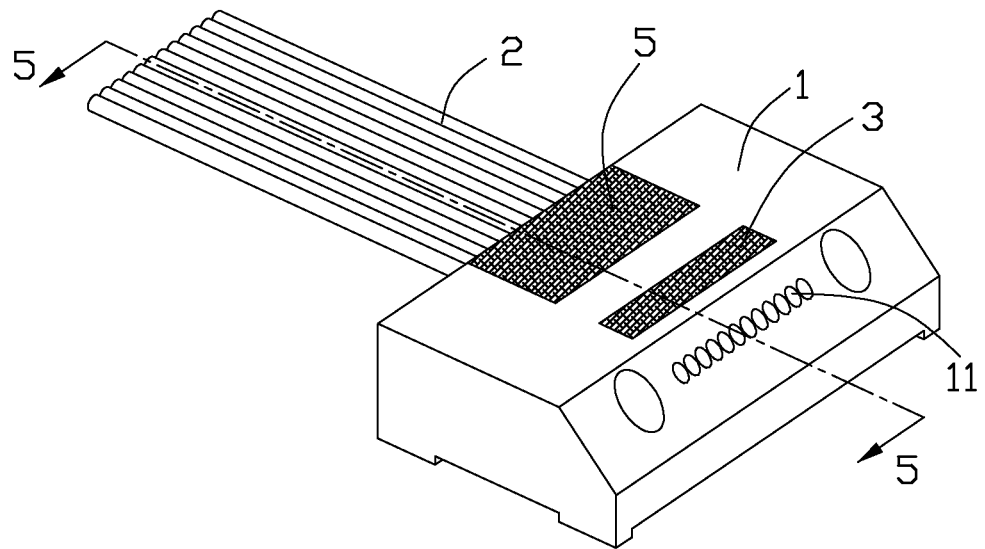
FIG. 4 is similar to FIG. 3, wherein optical cement was used to position the fibers.
Figure 5:
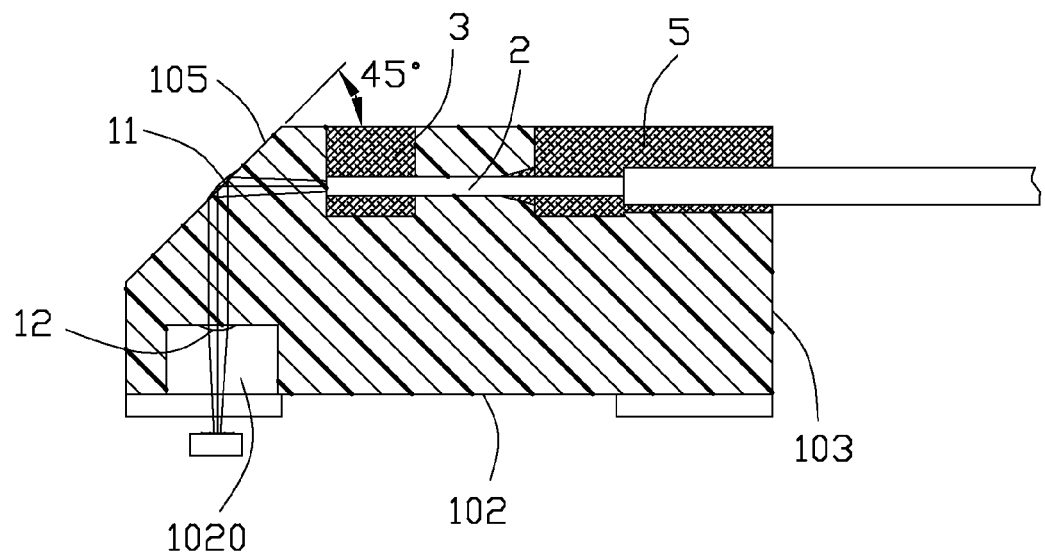
FIG. 5 is a cross-sectional view of the optical connector and the fibers as shown in FIG. 4 along line 5-5.

Referring to FIGS. 4 and 5, after the fibers 2 are assembled to the optical connector 1, gules 5 is filled in the second recess 1010 and optical cement 3 is filled in the first recess 1011 to position the fibers 2 on the optical connector 1. The fibers 2 contacts with the resin body 10, thus the light sent by the fibers 2 going to the lenses 11 directly and then going to the second lenses 12, then the light sent by the fibers 2 are transferred. The optical cement 3 in the first recess 1011 makes the light sent by the fibers 2 going to the lenses 11 not through the air. Due to the refractive index of the fiber 2, the optical cement 3 and the lens 11 are 1.46, 1.59 and 1.64, there is a little difference between the refractive index of the fiber 2, the optical cement 3 and the lens 11, thus the wastage of the light sent by the fibers 2 are reduced.

In this embodiment, the fibers 2 contact with the resin body 10, also the fibers 2 can disconnect with the resin body 10, thus the light sent by the fibers 2 goes through the optical cement 3 and then goes to the lenses 11.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. An optical connector for transferring light sent by fibers, comprising:

a resin body including a bottom surface, a top surface opposite to the bottom surface, a front surface connecting the top surface and the bottom surface, and a slant surface forming an angle with the front surface and the top surface; and a plurality of lenses set on the slant surface of the resin body; wherein the resin body includes a first recess recessed from the top surface to the inner of the resin body, when the fibers was assembled to the optical connector, the fibers locate in the first recess; wherein the optical connector further includes optical cement filled in the first recess, and the light sent by the fibers goes through the optical cement and then goes to the lenses.

2. The optical connector as claimed in claim 1, wherein the top surface includes a second recess recessed to the inner of the resin body, the resin body includes a retaining section located between the first recess and the second recess, the retaining section includes a plurality of holes for receiving the fibers.

3. The optical connector as claimed in claim 2, wherein the second recess penetrates the front surface, the resin body includes a positioning portion extending to the second recess, the positioning portion defines a plurality of slots corresponding to the holes for receiving the fibers.

4. The optical connector as claimed in claim 3, wherein the optical connector further includes glue filled in the second recess.

5. An optical connector for transferring light sent by fibers, comprising:
a resin body including a bottom surface, a top surface opposite to the bottom surface, a front surface connecting the top surface and the bottom surface, and a slant surface forming an angle with the front surface and the top surface;
a plurality of lenses set on the slant surface of the resin body; and
a plurality of fibers assembled to the resin body; wherein the resin body includes a first recess recessed from the top surface to the inner of the resin body, the fibers locate in the first recess and the optical connector further includes optical cement filled in the first recess, and the light sent by the fibers goes through the optical cement and then goes to the lenses.

6. The optical connector as claimed in claim 5, wherein the end of the fibers contact with the inner wall of the first recess.

7. The optical connector as claimed in claim 5, wherein the top surface includes a second recess recessed to the inner of the resin body, the resin body includes a retaining section located between the first recess and the second recess, the retaining section includes a plurality of holes for receiving the fibers.

8. The optical connector as claimed in claim 7, wherein the second recess penetrates the front surface, the resin body includes a positioning portion extending to the second recess, the positioning portion defines a plurality of slots corresponding to the holes for receiving the fibers.

9. The optical connector as claimed in claim 8, wherein the optical connector further includes glue filled in the second recess to position the fibers.

10. An optical connector comprising:
a body forming a plurality of holes;
a plurality of first lenses unitarily formed upon a slanting surface of the body and aligned with the corresponding holes in a first direction, respectively;
a plurality of optical fibers received within the corresponding holes, respective, a front end of each of said optical fibers intimately confronting a surface of the body so as to have corresponding light beams divergently emit toward the corresponding first lens; and
a plurality of second lenses unitarily formed upon a downward surface of the body and respectively aligned with the corresponding first lenses in a second direction angled to said first direction so as to have the second lenses and corresponding first lenses arranged in pairs;
the light beams are essentially transmitted in a parallel manner between the paired first lens and the second lens while being reflected by the first lens, and converged, by the second lens, toward an optoelectronic device distantly located under said second lens opposite to the corresponding first lens.

11. The optical connector as claimed in claim 10, wherein the front end of each of said optical fibers is secured to the surface via optical cement therebetween.

12. The optical connector as claimed in claim 11, wherein said body includes a recess to expose the front ends of the optical fibers and the surface for filling of said optical cement.

13. The optical connector as claimed in claim 11, wherein said body includes a recess behind the corresponding holes to secure the optical fibers in position within the body via glue.

14. The optical connector as claimed in claim 1, wherein a refractive index of the optical cement is between those of the fiber and the lens.

15. The optical connector as claimed in claim 14, wherein the refractive index of the optical cement is 1.59 while the refractive index of the fiber is 1.46 and the refractive index of the lens is 1.64.

16. The optical connector as claimed in claim 5, wherein a refractive index of the optical cement is between those of the fiber and the lens.

17. The optical connector as claimed in claim 16, wherein the refractive index of the optical cement is 1.59 while the refractive index of the fiber is 1.46 and the refractive index of the lens is 1.64.

18. The optical connector as claimed in claim 10, wherein a refractive index of the optical cement is between those of the fiber and the lens.

19. The optical connector as claimed in claim 18, wherein the refractive index of the optical cement is 1.59 while the refractive index of the fiber is 1.46 and the refractive index of the lens is 1.64.

* * * * *